US008749690B2

(12) United States Patent
Flynn, III et al.

(10) Patent No.: US 8,749,690 B2
(45) Date of Patent: Jun. 10, 2014

(54) IN-CONTEXT CONTENT CAPTURE

(75) Inventors: William Joseph Flynn, III, San Francisco, CA (US); Michael Dudley Johnson, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 127 days.

(21) Appl. No.: 13/325,041

(22) Filed: Dec. 13, 2011

(65) Prior Publication Data

US 2013/0147971 A1 Jun. 13, 2013

(51) Int. Cl.
*H04N 5/222* (2006.01)

(52) U.S. Cl.
USPC .................................. 348/333.02; 348/333.01

(58) Field of Classification Search
USPC ........................................ 348/333.01, 333.02
See application file for complete search history.

(56) References Cited

U.S. PATENT DOCUMENTS

| 7,136,096 | B1 * | 11/2006 | Yamagishi et al. ........ 348/218.1 |
| 7,248,269 | B2 | 7/2007 | Card et al. |
| 7,656,429 | B2 * | 2/2010 | Larson .................... 348/208.14 |
| 7,827,208 | B2 | 11/2010 | Bosworth et al. |
| 8,171,128 | B2 | 5/2012 | Zuckerberg et al. |
| 2002/0149677 | A1 * | 10/2002 | Wright ...................... 348/207.1 |
| 2006/0240856 | A1 | 10/2006 | Counts et al. |
| 2009/0144661 | A1 | 6/2009 | Nakajima et al. |
| 2010/0105440 | A1 | 4/2010 | Kruzeniski et al. |
| 2010/0306648 | A1 | 12/2010 | Wilairat |
| 2012/0166532 | A1 | 6/2012 | Juan et al. |
| 2013/0031507 | A1 | 1/2013 | George |

OTHER PUBLICATIONS

Lessin, S., et al., U.S. Appl. No. 13/239,347, filed Sep. 21, 2011, 82 pages.

* cited by examiner

*Primary Examiner* — Anthony J Daniels
(74) *Attorney, Agent, or Firm* — Fenwick & West LLP (57) ABSTRACT

A user interface includes a tactile interface on a client device that allows users to interact with social networking system content in a manner that is optimized for touch screens and mobile devices. The tactile interface allows users to efficiently navigate the social networking system data as well as to capture new content for upload to the social networking system. New content may be captured in a way that allows the user to preview the content in-context.

15 Claims, 10 Drawing Sheets

IN-CONTEXT CONTENT CAPTURE

BACKGROUND

This invention relates generally to social networking system user interfaces and, in particular, to mobile and tactile interfaces for presenting social networking system information.

Social networking systems capture large volumes of information from various sources that are of interest to users. For a given user this information may include, for example, social data related to the user and her social connections, news related to the user's interests, entertainment selected for the user, and updates from the user's social connections. In the past users interacted with social networking systems through interfaces that were displayed on personal computer (PC) screens. However, there are a growing number of users that now interact with social networking systems through mobile devices such as smartphones, tablets, etc. Because the volume of social networking system information is large and continuously generated, it is not always practical to display this information on a mobile device using PC-adapted user interfaces. For example, the typical PC user interfaces, where the thumbnails and buttons are relatively small compared to the total user interface area, are poorly adapted to tactile interfaces such as the small touch screens of smart phones. The small screen size of touch screen smart phones makes it difficult to navigate and select data in interfaces that are designed for larger computer screens. In addition, interfaces designed for operation by mouse and keyboard do not always migrate well to touch screens and other tactile interfaces where touch and gestures are the primary mode of interaction.

In addition, the present interfaces for social networking systems are not well adapted to take advantage of the fact that modern mobile devices, such as smartphones and tablets, are not only capable of displaying content, but have the capability, through their image-capture and video-capture facilities, to create content that may be uploaded to the social networking system. Social networking systems currently do not have a way for users to preview content in its final social networking context as it is being captured.

SUMMARY

A tactile interface enables users of a social networking system to navigate and view the social networking system data in an intuitive and efficient manner. The tactile interface allows users to scroll through lists of social networking system stories, where each story includes a list of content. The lists of stories may be navigated on the vertical axis of the tactile interface, while the lists of content within the stories may be navigated independently on the horizontal axis. The navigation may be implemented as scrolling on a touch screen interface, where scrolling is activated by vertical or horizontal swipes by the user.

The velocity of scrolling may be modulated by the tactile interface using various physical models. In one embodiment the tactile interface modulates the scrolling velocity based on a friction model, where the boundaries between groups of stories act as high-friction, movement-slowing regions. The scrolling velocity modulation may be used to mask the loading of the stories from the social networking system.

The tactile interface also enables users to capture new content, such as video and images, in-context. In-context capture allows users to preview an image or video in a user interface view as it is being captured. This allows users to compose images and videos in the context in which they will be used.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system gathers and stores information related to a social networking system user and that user's social connections, and makes this information available to the user through an intuitive interface that is adapted to small form factors, mobile devices, and touch screens. The social networking system may generates stories and story aggregations based upon data in the social networking system, and generates displayable representations of selected stories and story aggregations, which are dispatched to client devices for display to social networking system users through a tactile interface. The tactile interface has several components that enable efficient and intuitive access to the information in the stories and story aggregations. The tactile interface also gives social networking system users the ability to capture content, such as images, in a way that allows the content to be previewed in real-time in its final social networking system context, during the capture process.

System Overview

Figure 1:
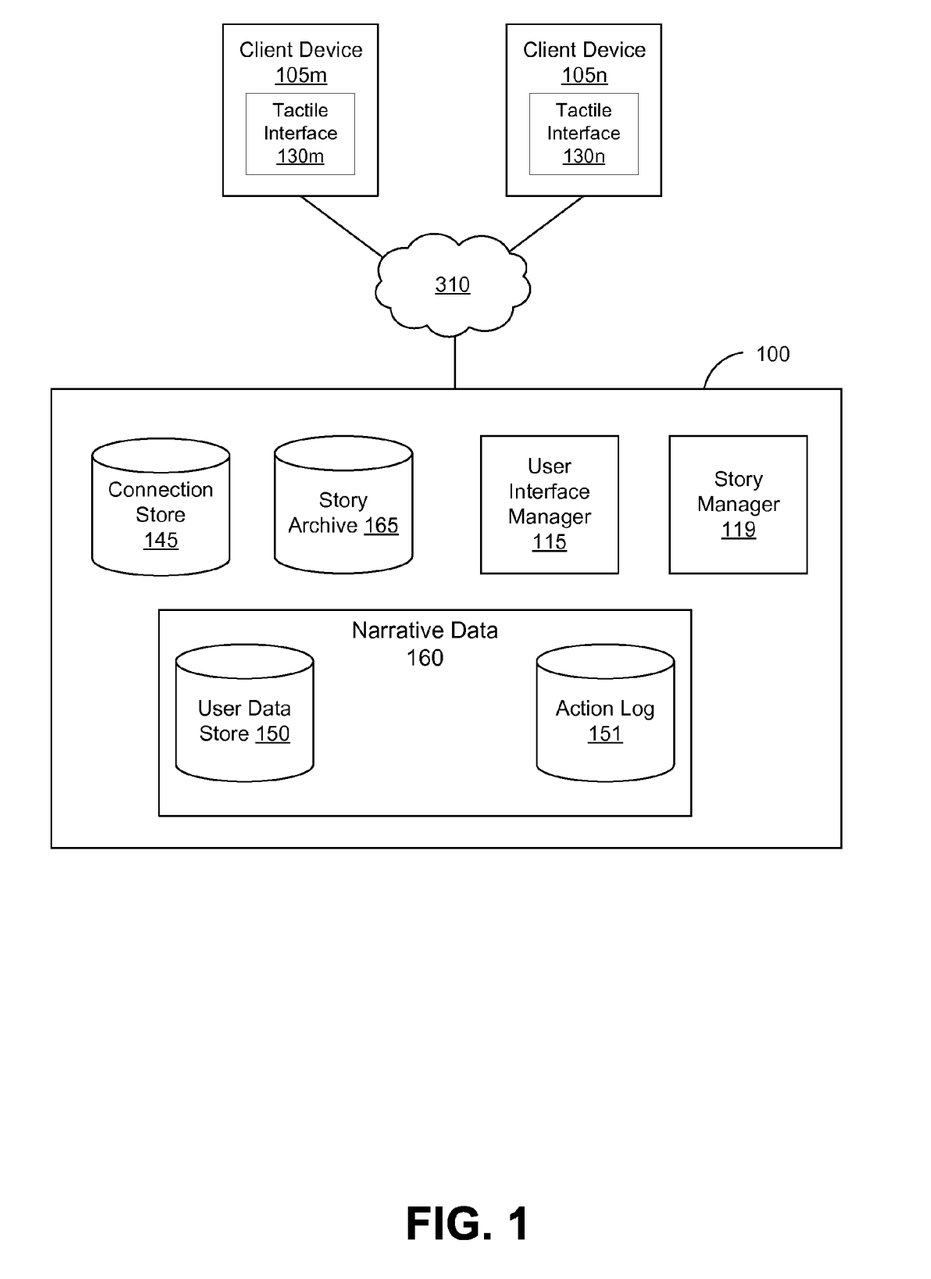
FIG. 1 is a diagram of a system environment for presenting a tactile interface to users of a social networking system, in accordance with an embodiment of the invention.

FIG. 1 is a diagram of a system environment for presenting a tactile interface to users of a social networking system. The users interact with the social networking system 100 using client devices 105. Some embodiments of the systems 100 and 105 have different and/or other modules than the ones described herein, and the functions can be distributed among the modules in a different manner than described here.

The interactions between the client devices 105 and the social networking system 100 are typically performed via a network 310, for example, via the internet. The network 310 enables communications between the client device 105 and the social networking system 100. In one embodiment, the network 310 uses standard communications technologies and/or protocols. Thus, the network 310 can include links using technologies such as Ethernet, 802.11, worldwide interoperability for microwave access (WiMAX), 3G, 4G, LTE, digital subscriber line (DSL), asynchronous transfer mode (ATM), InfiniBand, PCI Express Advanced Switching, etc.

The social networking system 100 offers its users the ability to communicate and interact with other users of the social networking system 100. Users join the social networking system 100 and then add connections to other users of the social networking system 100 to whom they wish to be connected. These connected users are called the "friends" of the user. When a user joins the social networking system 100 they may create a user account. The user account enables the user to maintain a persistent and secure identity on the social networking system 100. The user account may include a user profile that stores details about the user, such as name, age, sex, etc. The social networking system 100 may provide a stream of data to a user to keep her updated on the activities of her friends, as well as to inform her about news and information related to her interests. This stream of data may include stories and story aggregations. The stories are collections of related data that are presented together to a user. Stories and story aggregations are discussed in more detail herein.

In one embodiment the client device 105 used by a user for interacting with the social networking system 100 can be a personal computer (PC), a desktop computer, a laptop computer, a notebook, tablet PC, a personal digital assistant (PDA), mobile telephone, smartphone, internet tablet, or any similar device with a screen and network communication capability. These devices may include a camera sensor that allows image and video content to be captured and uploaded to the social networking system 100. These devices may also have a touch screen, gesture recognition system, mouse pad, or other technology that allows a user to interact with the social networking system 100 through a tactile interface 130. The tactile interface 130 is discussed in more detail herein.

The social networking system 100 maintains different types of data objects, for example, user data objects, action objects, and connection objects. A user data object stores information related to a user of the social networking system 100. For example, a user data object may store a user's date of birth, or may store a photo of the user, or may store a reference to a photo of the user. User data objects are stored in the user data store 150. A connection object stores information describing the relationship between two users of the social networking system or in general any two entities represented in the social networking system 100. Connection objects are stored in the connection store 145. An action object stores information related to actions performed by users of the social networking system 100. Almost any activity of a user of a social networking system can be stored as an action. For example, an action can be the posting of a new comment or status update, or it can be something as simple as forming a connection to another user. Action objects are stored in the action log 151. The user data in the user data store 150 and the action objects in the action log 151 are collectively called the narrative data 160.

The social networking system 100 may maintain a social graph that tracks the relationship between the various objects, users, and events captured by the social networking system 100. In the social graph the users, the user data, and other entities, exist as nodes that have edges that are connections to other nodes. In this embodiment the edges represent actions that create a relationship between the nodes. For example, a node representing a photograph stored in the social networking system 100 may have an edge to a user that uploaded the photograph, and this edge may be an "uploaded by" action. The same photograph may have edges to several other nodes that represent the users in that photograph, and these edges may be "tagged in" actions. Similarly, a node representing a user in the social networking system 100 may have edges to each node representing posts made by that user. These edges may all be "posted by" actions. The edges in the social graph can have different types that correspond to the different types of actions taken by users of the social networking system 100.

The social networking system 100 may maintain or compute a measure of a user's "affinity" for other users (or objects) in the social networking system 100. The measure of affinity may be expressed as an affinity score, which may represent that user's closeness to another user (or object) of the social networking system 100. The affinity score of a user X for another user Y can be used to predict, for example, if user X would be interested in viewing or likely to view a photo of user Y. The affinity scores can be computed by the social networking system 100 through automated methods, including through predictor functions, machine-learned algorithms, or any other suitable algorithm for determining user affinities. The social networking system 100 may store an archive of historical affinity scores for a user as their affinity scores for various users and objects changes over time. Systems and methods for computing user affinities for other users of a social networking system 100, as well as for other objects in the system, are disclosed in U.S. application Ser. No. 12/978,265, filed on Dec. 23, 2010, which is incorporated by reference in its entirety.

The social networking system 100 also comprises a user interface manager 115. The user interface manager 115 provides the server-side functionality that allows users of the social networking system 100 to interact with the social networking system 100 via the tactile interface 130. When users request information from the social networking system 100, the user interface manager 115 dispatches the requested information to users in a format that can be displayed through the tactile interface 130. For example, when a user requests a news feed from the social networking system 100, the user interface manager 115 may send stories and story aggregations to the client devices 105 that are configured to be displayed on the tactile interface 130 on that device. Depending on the type of information requested by a user, the user interface manager 115 may send stories, story aggregations, profile pages, timelines, or other data to the client device 105. Stories, story aggregations, profile pages, and timelines are discussed in more detail herein.

The client device 105 executes a tactile interface 130 to allow the user to interact with the social networking system 100. The tactile interface 130 allows the user to perform various actions associated with the social networking system 100 and to view information provided by the social networking system 100. The actions performed using the tactile interface 130 include adding connections, posting messages, posting links, uploading images or videos, updating the user's profile settings, viewing stories, and the like. The information provided by the social networking system 100 that can be viewed using the tactile interface 130 includes, images or videos posted by the user's connections, comments posted by the user's connections, messages sent to the user by other users, and wall posts. In an embodiment, the tactile interface 130 is presented to the user via a mobile browser application that allows a user to retrieve and present information from the internet or from a private network. In this embodiment the HTML, JAVASCRIPT, and other computer code necessary to implement the tactile interface 130, may be provided by the user interface manager 115. In a different embodiment, the tactile interface 130 consists of a mobile app running on a mobile device such as a smart phone or tablet. In this embodiment the computer code that executes to implement the tactile interface 130 may be downloaded from a third-party server (such as an application store), but the data presented in the tactile interface 130 and the code for formatting this data may still be provided by the user interface manager 115.

When a user 'A' views the data of another user 'B' the first user 'A' is called the 'viewing user', and the second user 'B' is called the 'subject user'. The tactile interface 130 allows viewing users to view the data of other subject users of the social networking system 100 as well as general data related to news, sports, interests, etc. Information in the tactile interface 130 may be presented to viewing users in different views. For example, the social data of subject users can be presented to viewing users by way of a "profile page," which is an arrangement of the users' social networking data. The information about subject users may also be presented in the form of a news feed containing stories. In one embodiment the different views consist of data and code in a web standard format presented through a browser. For example, a news feed may consist of combination of any of XML, HTML, CSS, Javascript, plaintext and Java sent from a server to a web browser running on a client. In another embodiment a news feed may consist of data formatted for presentation through a mobile app or desktop application.

A social network story (or just "story") is an aggregation of data gathered by the social networking system 100 that is configured for display in various social networking system views (user interface views). For example, stories can be presented to viewing users in a continuously updated real-time newsfeed in a web browser, or in a timeline view, or on a user's profile page. A story aggregation is simply a collection of one or more stories gathered together for display. For example, all the stories related to a particular event, such as a birthday party, may be aggregated into one story aggregation.

The story manager 119 manages the story generation process. The story manager 119 comprises many different types of story generators configured to generate stories for different purposes (i.e. different views). The generated stories are stored in the story archive 165. Story generators are configured to generate stories for a particular target view, and they may restrict the selection of narrative data that they use in story generation based on the target view. For example, a story generator may be configured to generate stories for a photo album view, and based on this purpose it may restrict the narrative data that it uses to generate stories to narrative data that contains or references images. Stories generated to be displayed in a tactile interface may contain different data than stories generated to be displayed in a desktop PC interface, and they may be visually formatted in a different way in order to optimize for the differences between a PC display and tactile display (e.g. larger icons for a smaller smartphone screen). The social networking system 100 may also restrict the stories that are provided to a viewing user to stories that contain data related to the connections of the viewing user, i.e. to stories containing data about subject users that are connected to the viewing user in the social networking system 100.

A newsfeed is simply a scrollable list of the most relevant recent stories that may be of interest to a viewing user. Relevance may be determined by the story manager 119 based on affinity or other factors. A timeline is a chronological list of stories related to a particular subject user that are ordered by time period. In some embodiments, a timeline may alter the ranking of some stories depending on other factors such as social importance or likely engagement value. Stories that are configured for display in a timeline are called timeline units. A timeline may also include special "report" units, which consist of multiple timeline units that have been aggregated together. For example, a user may have several wall posts from friends during the month of November. That user's timeline can then include a report unit containing all posts from friends during that month. For newsfeeds and timelines there may be multiple story generators producing stories of different types that are displayed together. Systems and methods for generating stories for a newsfeed from data captured by a social networking system are disclosed in U.S. application Ser. No. 11/503,037, filed on Aug. 11, 2006, and U.S. application Ser. No. 11/502,757, filed on Aug. 11, 2006, which are incorporated by reference in their entirety. Timelines and timeline units are discussed in more detail in utility application U.S. application Ser. No. 13/239,347, filed on Sep. 21, 2011, which is also incorporated by reference in its entirety.

Tactile Interface Details

Figure 2:
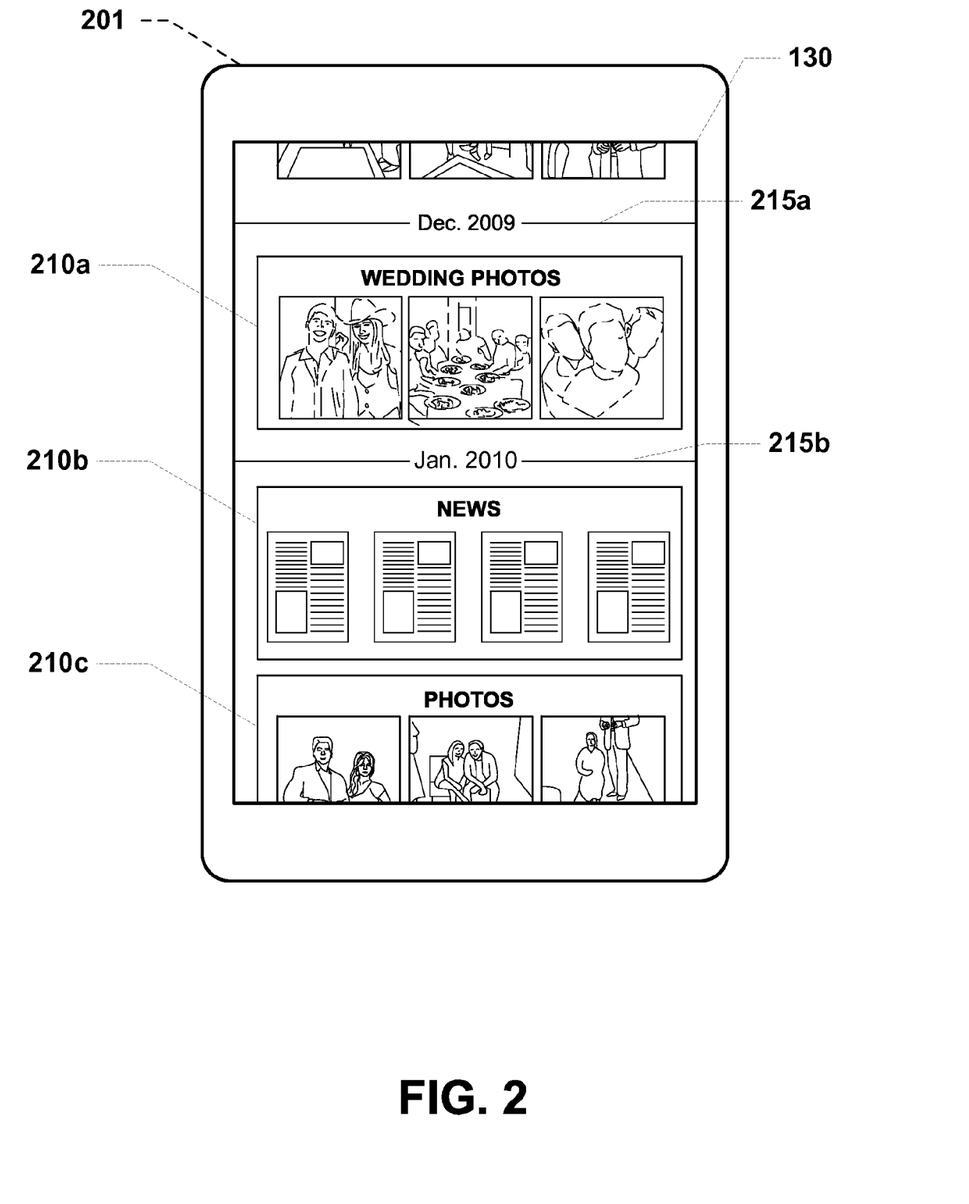
FIG. 2 illustrates one embodiment of a tactile interface displaying social networking system stories on a mobile device.

FIG. 2 is a diagram illustrating one example embodiment of a tactile interface 130 displayed on a mobile device 201. In this embodiment the tactile interface 130 includes several stories 210 in a scrollable list. In this case the stories are timeline units related to a single user and are arranged in a timeline, where the distinct time periods are delineated by time period separators 215. For example, the December 2009 time period separator 215a has a single story 210a under it, where the story 210a contains wedding photos from that time period. The January 2010 time period separator 215b has two stories visible (others may be off screen, but may be revealed by scrolling). One story contains news from that time period 210b, while the other is another photo story 210c. In other embodiments there may be story aggregations in place of one or more of the stories 210. The story aggregations display stories in a horizontal list, similar to the way that stories display content in a horizontal list.

Figure 3A:
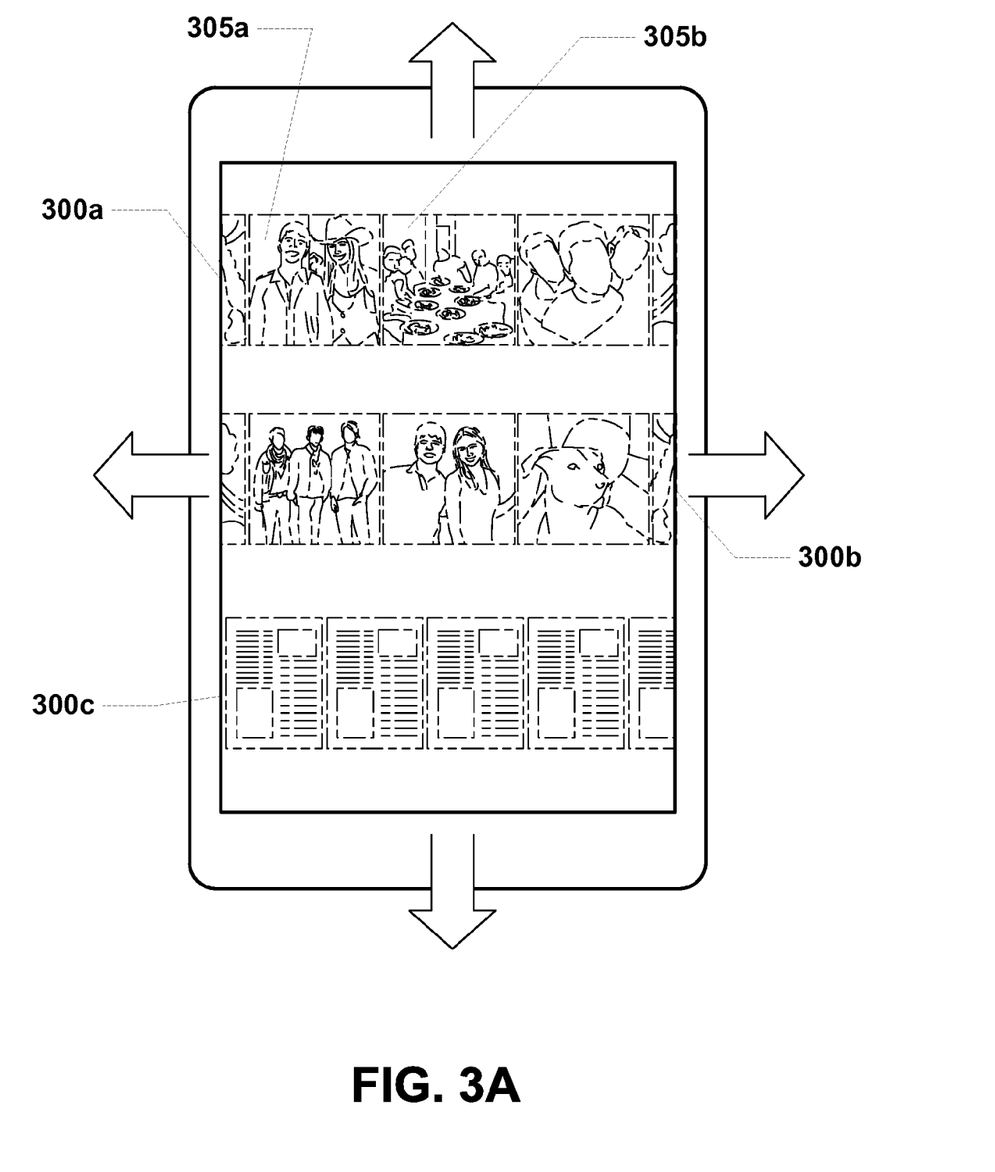
FIGS. 3A and 3B illustrate one embodiment of a scrolling interface employed by a tactile interface on a mobile device.

In this view the tactile interface may be considered a list of lists. It is a list of stories 210 separated by time period separators 215, where each story 210 comprises a list of content (in this case photos and news stories). As illustrated in FIG. 3A, the tactile interface allows viewing users to scroll through content both horizontally and vertically using a touch-based interface. Stories and content may be partially occluded by the boundaries of the screen or tactile interface and users may use scrolling to reveal new stories and content. If the tactile interface is implemented on a touch screen, then a user may vertically scroll by using a vertical swipe gesture, and may horizontally scroll by using a horizontal swipe gesture. Other interface systems may use different gestures to activate vertical and horizontal scrolling.

Vertical scrolling allows viewing users to navigate between the stories 300. In this illustration there are three stories visible on the screen. Stories 300a and 300b contain photos, while story 300c contains text news stories. Scrolling horizontally allows a viewing user to navigate the content that is contained within a story. In this case, for example, a viewing user can navigate between the photos 305 within the story 300a by scrolling through them horizontally.

Figure 3B:
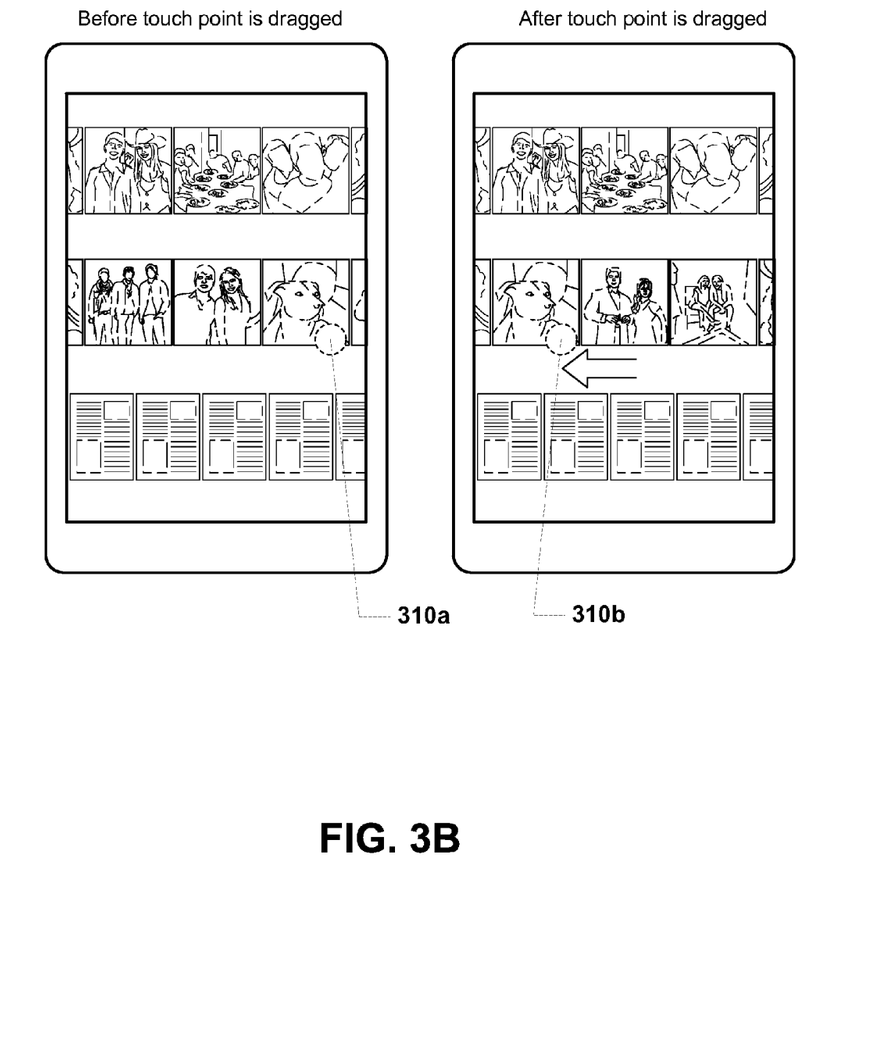

As illustrated in FIG. 3B the horizontal scrolling may be accomplished by a viewing user by dragging a touch point 310a horizontally to a new position 310b. As shown in the figure, horizontal scrolling does not scroll all the content on the screen, but rather scrolls only the content in the story within which the viewing user is dragging a touch point 310.

The scrolling velocity of the touch screen can be controlled by the viewing user through gestures (e.g. flicking a finger quickly on the screen may cause the list of stories to scroll more quickly. The tactile interface 130 may also moderate the velocity of scrolling in order to provide feedback to a viewing user regarding boundaries between content. For example, in FIG. 2, the tactile interface 130 may cause the scrolling velocity to slow whenever a time period separator 215 for a new year appears on the screen. In this illustration, for instance, the scrolling velocity might slow when the time period separator 215*b* for January 2010 first appears on the touch screen. The slowing of the scroll velocity may be accompanied by a sound, haptic feedback (such as vibration), or visual cues, or any other feedback that help to notify the user that a boundary has been crossed.

Figure 4:
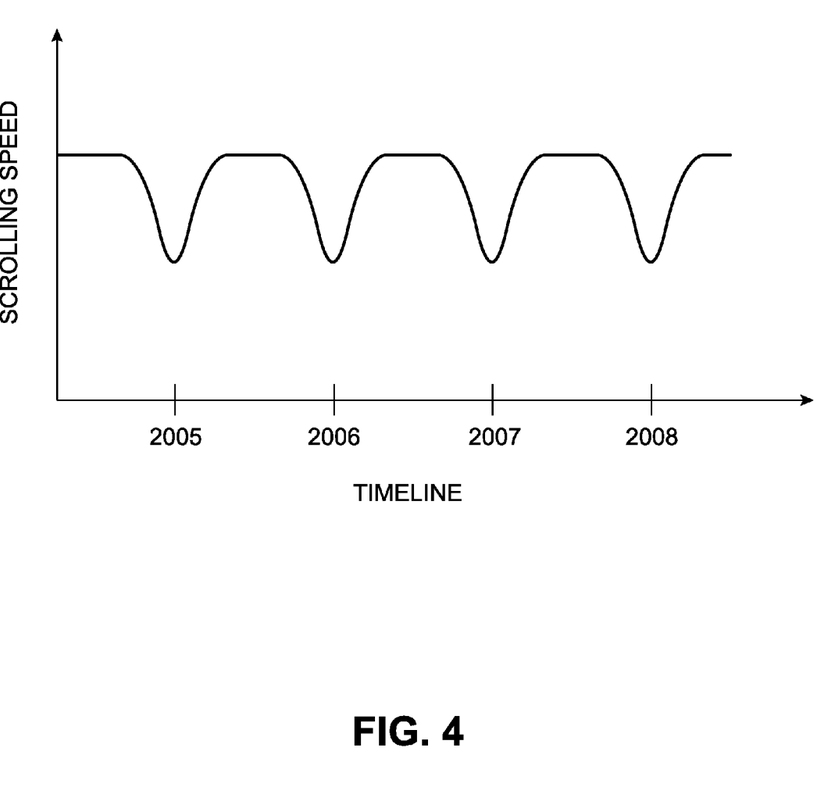
FIG. 4 illustrates a graph showing how scrolling velocity varies with the scroll position in a timeline, in one embodiment of a tactile interface.

The modulation of the scroll velocity can be controlled in various ways. In one embodiment the scrolling velocity is controlled using a physical friction model where a high friction coefficient is used for the boundaries, while the spaces between boundaries are given a low friction coefficient. FIG. 4 illustrates a graph showing one possible distribution of scrolling velocities across a timeline in a tactile interface that uses friction modeling to modulate scrolling velocity. As illustrated in this graph, the scrolling velocity is highest when viewing users are navigating content in the middle of time periods, while the velocity slows drastically as viewing users navigate the timeline close to the boundaries between years. Different models may be used to change the manner in which scrolling velocities are modulated, and using a friction based model is only one example. Other examples include using momentum based models, gravity based models, elasticity based models, etc.

In one embodiment the modulation of the scroll velocity may be used to mask latency in downloading new stories from the social networking system 100 to the client device 105. In this embodiment the scroll velocity is slowed when the viewing user is about to scroll to the end of the list of currently loaded stories. As the user approaches the end of the list of stories, new stories are requested from the social networking system 100, and as these new stories are downloaded the scroll velocity may be increased again.

In-Context Content Capture

Figure 5:
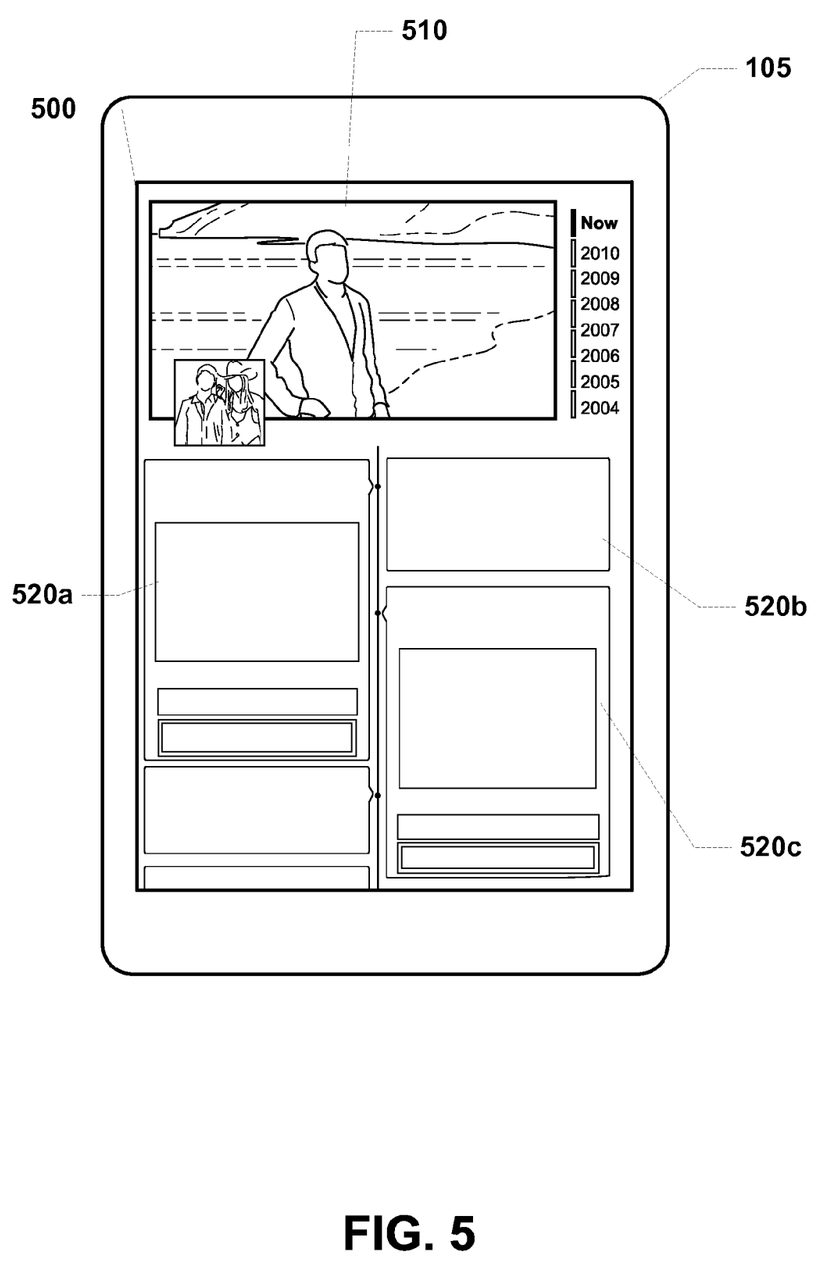
FIG. 5 illustrates an example embodiment of a profile page displayed in a tactile interface.

As mentioned earlier, the information of the social networking system 100 may be presented to a viewing user in different user interface views. In one embodiment the social data related to a subject user is presented to a viewing user in the form of a profile page. FIG. 5 illustrates one embodiment of a profile page 500, which includes a cover photo 510, and stories 520.

The cover photo 510 is a photo that is selected by the subject user to represent himself to other users of the social networking system. The stories 520 are generated from selected narrative data 160 related to the user.

The image used as the cover photo 510 may be selected by a user from pre-existing images that the user has captured in the past, or the user may utilize a camera that is attached to the client device 105 to capture a new image, in-context, to use as the cover photo 510.

Figure 6:
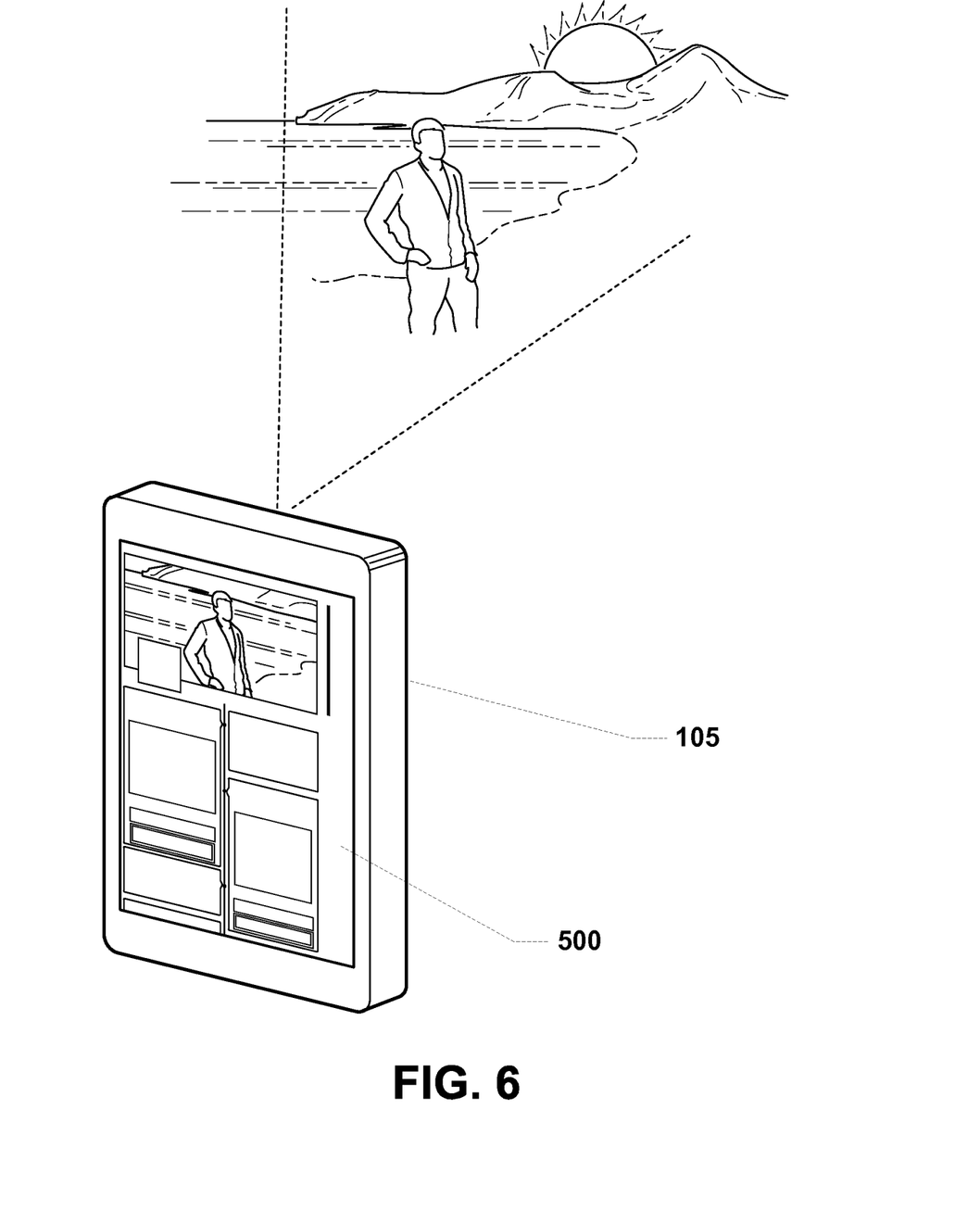
FIG. 6 illustrates a client device performing in-context content capture of a scene, according to one embodiment.

FIG. 6 illustrates the client device 105 capturing image or video content in the context of the profile page 500. In-context content capture allows a user to preview a live scene directly within the context in which the image or video of that scene will be used. This context may include the overlaying of other page elements such as the profile picture over the cover photo. The cover photo then needs to be selected in such a way that elements in the image are not hidden by the overlaid elements in the final rendering of the page. In-context content capture allows a user to compose the image or video that is being captured with the context of its presentation in mind. With this capability a user can adjust the lighting of a scene, its exposure, the filters used, the framing and view of the subject, etc., in order to fit the context in a more aesthetically pleasing manner.

Figure 7A:
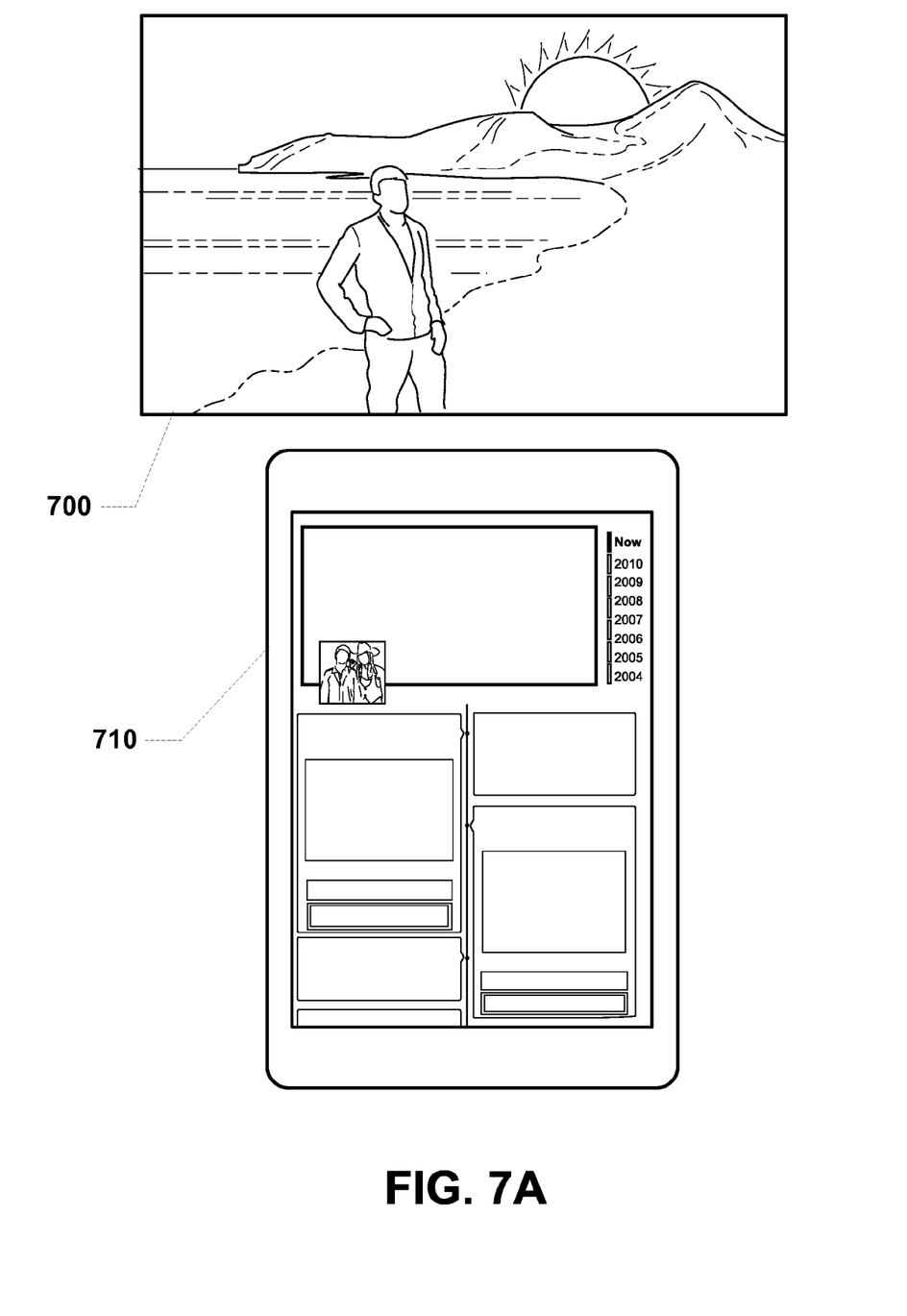
FIGS. 7A, 7B, and 7C illustrate one embodiment of a process used a client device to perform in-context content capture.
Figure 7B:
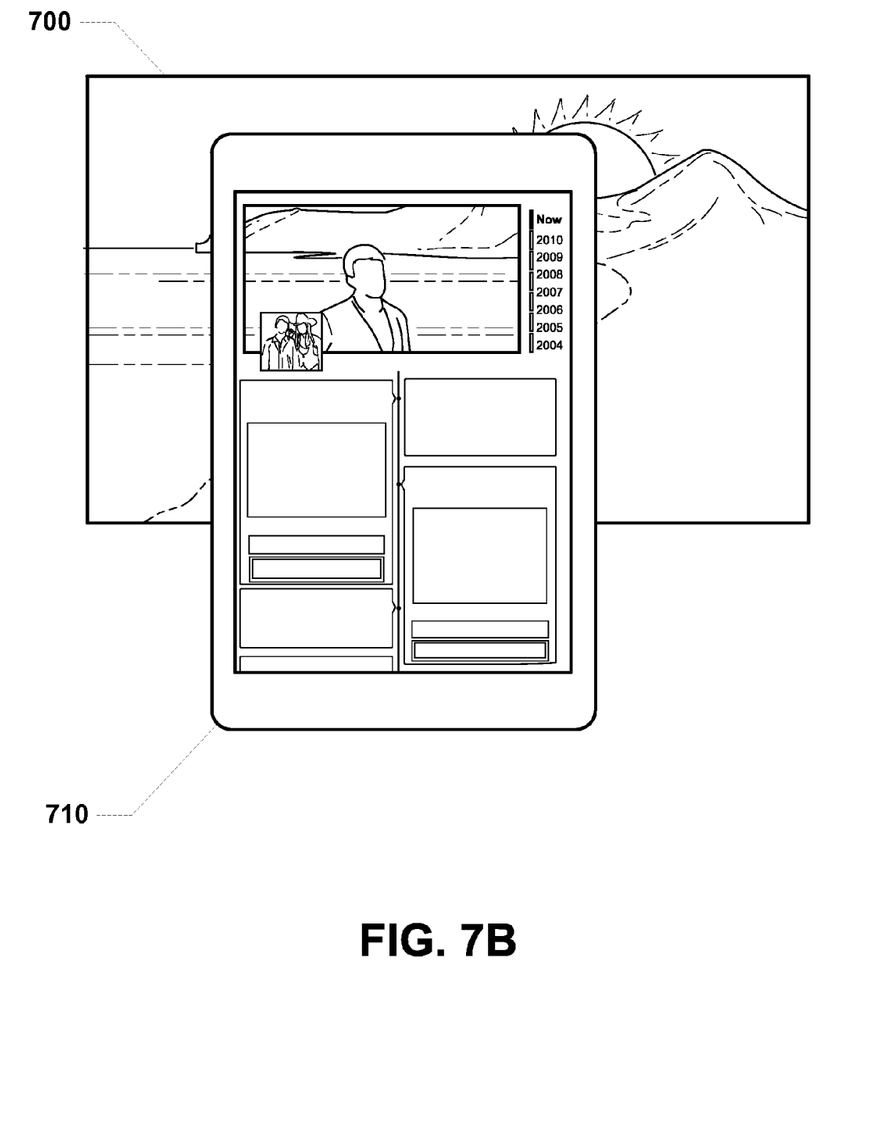
Figure 7C:
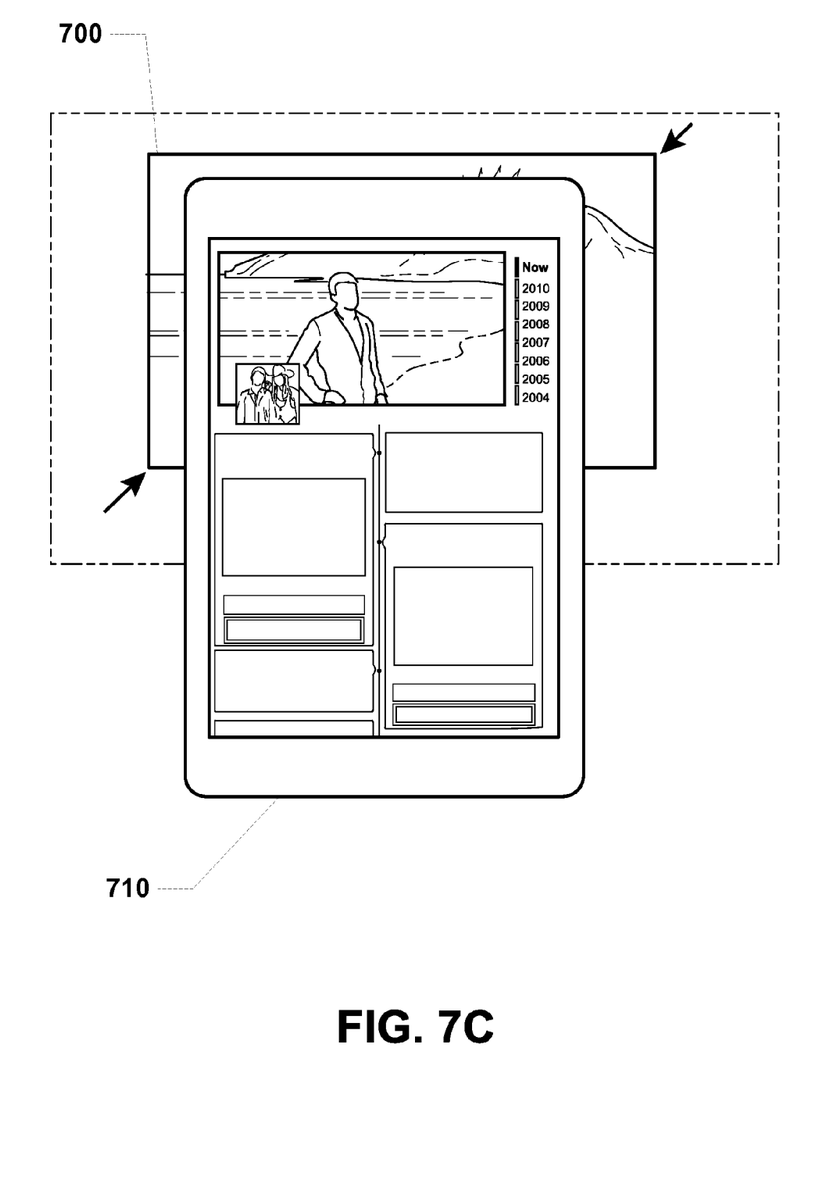

FIG. 7A, FIG. 7B, and FIG. 7C illustrate one embodiment of a process used on the client device 105 to capture images and videos in-context for use in a social networking system view, such as the profile page 500.

In order to display an image or video in-context to a user as it is being taken, the client device 105 must combine two distinct image layers. The first layer is the live view 700 from the camera of the client device 105. The second layer is an interface mask 710 that is generated from the user interface view. In the illustration shown in FIG. 7A the mask is generated from the profile page view described above. The interface mask 710 looks identical to the user interface view from which it is generated, except that the place where the captured image would reside is left empty.

To allow a user to compose the image or video in-context before capture, the client device 105 displays the live image 700 behind the interface mask 710. FIG. 7B illustrates this configuration. In the illustrated embodiment it would appear to a user that the cover photo 510 has been replaced with a live view of the scene visible to the camera of the client device 105.

As illustrated in FIG. 7C, the user may then manipulate the live image 700 in-context by applying transformations (e.g. panning, scaling, rotating) in order to compose the desired image or video of the scene for that context. Once the desired composition has been achieved the client device 105 stores that image or video by capturing the image or video from its camera and applying the user-defined transformations. The transformed image or video may then be cropped using the interface mask (although cropping may be unnecessary if the transformed image or video fits the context directly). The image or video is then displayed in the user interface view (in this case the profile page), and the image or video may be uploaded to the social networking system 100 for storage, along with instructions to associate it with the user. When other users request to view the user's profile page, the transformed (and possibly cropped) image or video will be displayed to those users in the profile page.

Practical Concerns

In some embodiments, the modules of the social networking system 100 are not contained within a single networking system but are found across several such systems. The social networking system 100 may communicate with the other systems, for example, using APIs. In these embodiments, some modules shown in FIG. 3 may run in the social networking system 100, whereas other modules may run in the other systems. For example, in one embodiment the user data store 150 and action log 151, may run on some external networked database system outside the social networking system 100.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described. Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
providing a user interface view corresponding to a web page, the user interface view defining a cropping region in which a photo is to be included in the user interface view;
receiving an input at a mobile device to take a photo for inclusion in the user interface view;
activating a camera of the mobile device to obtain image data therefrom;
displaying the image data from the camera on a display screen of the mobile device, the displayed image data overlaid by the user interface view so that the image data from the camera is displayed in the cropping region;
receiving a user input to capture an image using the camera;
responsive to the user input, capturing the image; and
cropping the image, the cropped image corresponding to the image data from the camera that was within the cropping region of the user interface view when the user input to capture the image was received.

2. The method of claim 1, further comprising:
incorporating the cropped image into the user interface view so that the cropped image appears within the cropping region.

3. The method of claim 1, further comprising:
sending the cropped image to an online system with instructions to associate the cropped image with an account of a user of the online system.

4. The method of claim 1, wherein the user interface view comprises a profile page for a user of an online system, and the cropping region is associated with a profile picture for the user.

5. The method of claim 1, wherein the image data comprises a video stream from the camera.

6. A non-transitory computer-readable storage medium storing instructions, the instructions when executed causing a processor to perform steps comprising:
providing a user interface view corresponding to a web page, the user interface view defining a cropping region in which a photo is to be included in the user interface view;
receiving an input at a mobile device to take a photo for inclusion in the user interface view;
activating a camera of the mobile device to obtain image data therefrom;
displaying the image data from the camera on a display screen of the mobile device, the displayed image data overlaid by the user interface view so that the image data from the camera is displayed in the cropping region;
receiving a user input to capture an image using the camera;
responsive to the user input, capturing the image; and
cropping the image, the cropped image corresponding to the image data from the camera that was within the cropping region of the user interface view when the user input to capture the image was received.

7. The non-transitory computer-readable storage medium of claim 6, the instructions causing the processor to perform further steps comprising:
incorporating the cropped image into the user interface view so that the cropped image appears within the cropping region.

8. The non-transitory computer-readable storage medium of claim 6, the instructions causing the processor to perform further steps comprising:
sending the cropped image to an online system with instructions to associate the cropped image with an account of a user of the online system.

9. The non-transitory computer-readable storage medium of claim 6, wherein the user interface view comprises a profile page for a user of an online system, and the cropping region is associated with a profile picture for the user.

10. The non-transitory computer-readable storage medium of claim 6, wherein the image data comprises a video stream from the camera.

11. A computer system comprising:
a processor;
a capture module configured to:
provide a user interface view corresponding to a web page, the user interface view defining a cropping region in which a photo is to be included in the user interface view;

receive an input at a mobile device to take a photo for inclusion in the user interface view;

activate a camera of the mobile device to obtain image data therefrom;

display the image data from the camera on a display screen of the mobile device, the displayed image data overlaid by the user interface view so that the image data from the camera is displayed in the cropping region;

receive a user input to capture an image using the camera;

responsive to the user input, capture the image; and crop the image, the cropped image corresponding to the image data from the camera that was within the cropping region of the user interface view when the user input to capture the image was received.

12. The computer system of claim 11, the capture module further configured to:

incorporate the cropped image into the user interface view so that the cropped image appears within the cropping region.

13. The computer system of claim 11, the capture module further configured to:

send the cropped image to an online system with instructions to associate the cropped image with an account of a user of the online system.

14. The computer system of claim 11, wherein the user interface view comprises a profile page for a user of an online system, and the cropping region is associated with a profile picture for the user.

15. The computer system of claim 11, wherein the image data comprises a video stream from the camera.

\* \* \* \* \*